(12) United States Patent
Yazici et al.

(10) Patent No.: US 12,545,415 B1
(45) Date of Patent: Feb. 10, 2026

(54) GAS TURBINE ENGINE AIRCRAFT MOUNTING SYSTEM

(71) Applicant: RTX Corporation, Farmington, CT (US)

(72) Inventors: Murat Yazici, Glastonbury, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/231,313

(22) Filed: Jun. 6, 2025

(51) Int. Cl.
*B64D 27/40* (2024.01)
*B64D 27/18* (2006.01)
*F02C 7/20* (2006.01)

(52) U.S. Cl.
CPC ........... *B64D 27/406* (2024.01); *B64D 27/18* (2013.01); *B64D 27/404* (2024.01); *F02C 7/20* (2013.01); *F05D 2240/90* (2013.01)

(58) Field of Classification Search
CPC .............................. B64D 27/404; B64D 27/406
See application file for complete search history.

(56) References Cited

U.S. PATENT DOCUMENTS

| | | |
|---|---|---|
| 4,013,246 A | 3/1977 | Nightingale |
| 5,452,575 A | 9/1995 | Freid |
| 7,156,343 B2 * | 1/2007 | Marche ............... B64D 27/406 244/54 |
| 7,232,091 B2 | 6/2007 | Marche |
| 8,672,260 B2 | 3/2014 | Penda |
| 8,985,509 B2 * | 3/2015 | Sandy ................. B64D 27/406 244/54 |
| 10,723,471 B2 * | 7/2020 | Stuart ................. B64D 27/406 |
| 12,129,767 B1 * | 10/2024 | Sage ...................... F01D 25/28 |

FOREIGN PATENT DOCUMENTS

| | | | | |
|---|---|---|---|---|
| FR | 2925016 A1 * | 6/2009 | ........... | B64D 27/406 |
| FR | 2963320 A1 * | 2/2012 | ........... | B64D 27/406 |

* cited by examiner

*Primary Examiner* — Richard Green
(74) *Attorney, Agent, or Firm* — Getz Balich LLC

(57) ABSTRACT

An aircraft system is provided that includes a pylon, a gas turbine engine, a forward mount, an aft mount, and a thrust link. The gas turbine engine includes a compressor section, a fan section, and a turbine exhaust case (TEC). The gas turbine engine has an axially extending engine centerline. The forward mount is connected to the compressor section and the pylon along a mount plane. The aft mount is connected to the TEC and the pylon. The thrust link extends along a thrust link centerline between the forward mount and the compressor section. The thrust link is oriented such that a thrust link vector coincident with the thrust link centerline intersects with the mount plane at an intersection point that is located below the engine centerline.

20 Claims, 6 Drawing Sheets

GAS TURBINE ENGINE AIRCRAFT MOUNTING SYSTEM

BACKGROUND OF THE INVENTION

1. Technical Field

The present disclosure relates to aircraft in general and to mounting systems for an aircraft propulsion system in particular.

2. Background Information

Various propulsion systems may be used to power an aircraft. Each of these propulsion systems must be attached to the aircraft in some manner. Very often, a propulsion system may include a gas turbine engine that is housed within a nacelle. The nacelle and the gas turbine engine may be attached to the wing of an aircraft via a pylon. While propulsion system mounting systems are known, there is still room in the art for improvement.

SUMMARY

According to an aspect of the present disclosure, an aircraft system is provided that comprises a pylon, a gas turbine engine, a forward mount, an aft mount, and a thrust link. The gas turbine engine comprises a compressor section, a fan section, and a turbine exhaust case (TEC). The gas turbine engine has an axially extending engine centerline. The forward mount is connected to the compressor section and the pylon along a mount plane. The aft mount is connected to the TEC and the pylon. The thrust link extends along a thrust link centerline between the forward mount and the compressor section. The thrust link is oriented such that a thrust link vector coincident with the thrust link centerline intersects with the mount plane at an intersection point that is located below the engine centerline.

In any of the aspects or embodiments described above and herein, the compressor section may include an intermediate case, and the forward mount may be connected to the intermediate case.

In any of the aspects or embodiments described above and herein, the compressor section may include a low pressure compressor section and a high pressure compressor section, and an intermediate case may be disposed axially between the low pressure compressor section and the high pressure compressor section.

In any of the aspects or embodiments described above and herein, the thrust link may be engaged with the forward mount at an aft end of the forward mount, and an acute angle may be disposed between a line disposed within the mount plane and the thrust link centerline.

In any of the aspects or embodiments described above and herein, the gas turbine engine may be a geared turbofan engine that includes a fan drive gear system that has a center of gravity. The center of gravity of the fan drive gear system may be located forward of the intersection point.

In any of the aspects or embodiments described above and herein, the fan section may have an outer radial fan diameter of about one hundred and ten inches or less.

In any of the aspects or embodiments described above and herein, the forward mount may be configured to accommodate a gravitational load, a lateral load, and a torque load.

In any of the aspects or embodiments described above and herein, the aft mount may be configured to accommodate a gravitational load, a lateral load, and a torque load.

According to an aspect of the present disclosure, an aircraft system is provided that comprises a pylon, a gas turbine engine, a forward mount, an aft mount, and a thrust link. The gas turbine engine comprises an axially extending engine centerline, a fan section, a compressor section, a turbine exhaust case (TEC), and a fan drive gear system (FDGS). The fan section has a fan outer radial diameter value. The forward mount is connected to the compressor section and to the pylon at a connection point wherein a mount plane extends through the connection point. The aft mount (AM) is connected to the TEC and to the pylon. The aft mount is separated from the forward mount by a mount separation distance value. The thrust link extends along a thrust link centerline between the forward mount and the compressor section. The thrust link is oriented such that a thrust link vector coincident with the thrust link centerline intersects with the mount plane at an intersection point. The FDGS includes a center of gravity (CG) and the FDGS CG is separated from the intersection point by an FDGS axial distance value. The system is configured such that when a parameter value "P" is determined using the mount separation distance value, the fan outer radial diameter value, the FDGS axial distance value, and the AM radial distance value, and an expression:

$$P = (B/E)^{*}(-C/D)$$

wherein within the expression, "B" represents the fan outer radial diameter value, "E" represents the mount separation distance value, "C" represents the FDGS axial distance value, and "D" represents the vertical distance between the engine centerline and the connection point, and the determined value for "P" is less than zero.

In any of the aspects or embodiments described above and herein, the intersection point may be located below the engine centerline.

In any of the aspects or embodiments described above and herein, the intersection point may be located aft of the FDGS CG.

In any of the aspects or embodiments described above and herein, the determined value for "P" may have a value that is in the range of −2.3 to −0.46.

In any of the aspects or embodiments described above and herein, the thrust link may be engaged with the forward mount at an aft end of the forward mount, and an acute angle may be disposed between a line disposed within the mount plane and the thrust link centerline.

In any of the aspects or embodiments described above and herein, the aft mount may be configured to accommodate a second gravitational load and a second lateral load.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
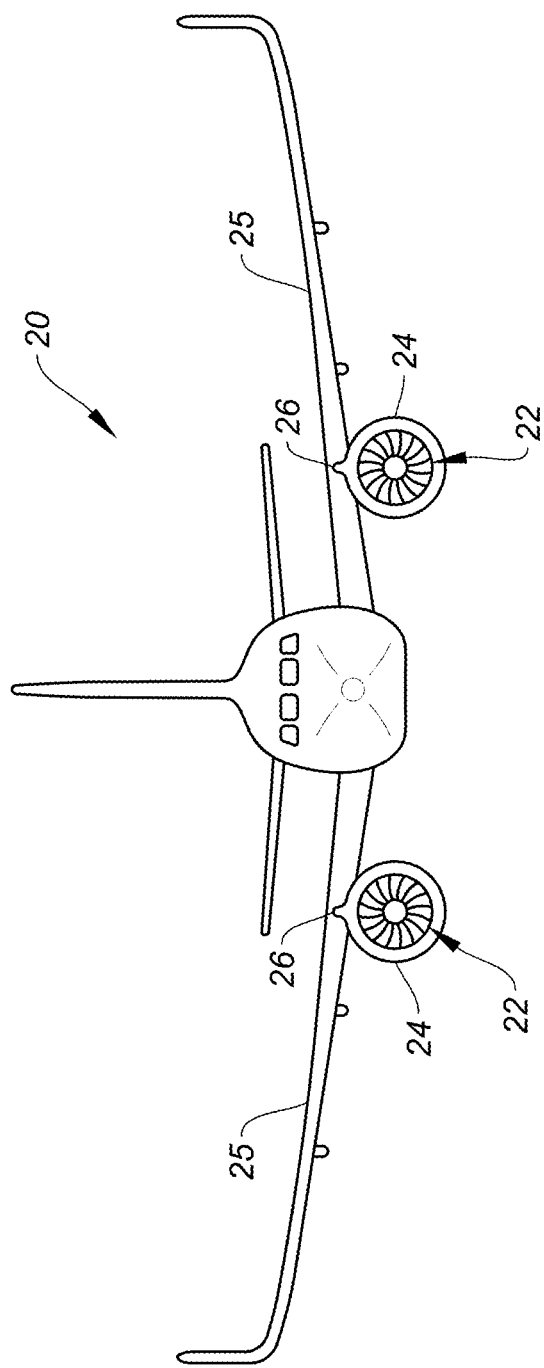
FIG. 1 is a diagrammatic frontal view of an aircraft.

FIG. 1 illustrates an aircraft 20 having a pair of propulsion systems 22, each mounted in a nacelle 24 connected to a respective wing 25 by a pylon 26. The propulsion system 22 may include a gas turbine engine 28 (see FIG. 2), or a hybrid electric propulsion (HEP) system, or the like.

Figure 2:
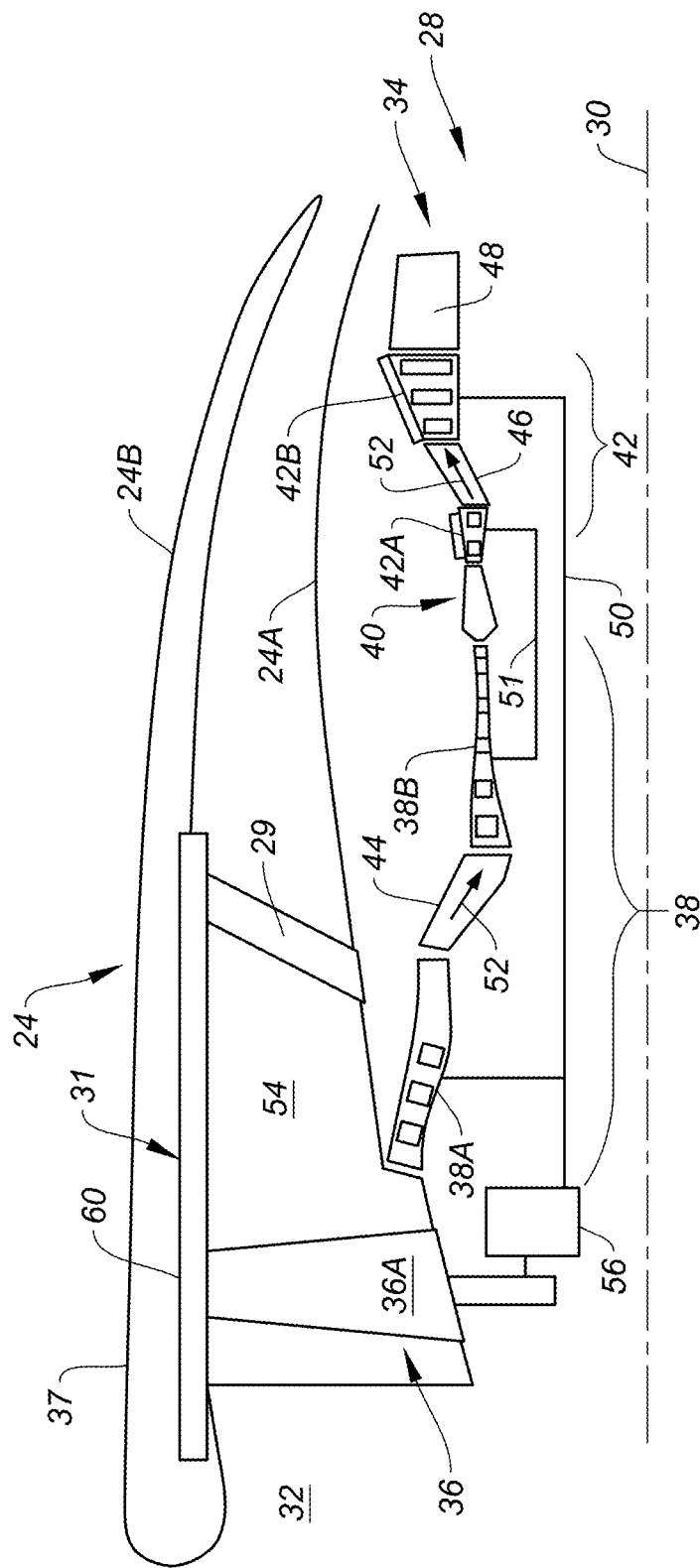
FIG. 2 is a diagrammatic sectional view of a gas turbine engine embodiment.

FIG. 2 shows a diagrammatic view of a gas turbine engine 28 disposed within a nacelle 24. The nacelle 24 includes an inner nacelle structure 24A and an outer nacelle structure 24B. In some embodiments, a fan exit guide vane ("FEGV 29") may extend between an inner wall structure of the inner nacelle structure 24A and an engine outer case structure 31 that includes a fan case 60. The FEGV 29 extends across a fan bypass air path 54.

The gas turbine engine 28 extends axially along an engine centerline 30 between an upstream airflow inlet 32 and a downstream exhaust 34. The gas turbine engine 28 includes a fan section 36, a compressor section 38, a combustion section 40, and a turbine section 42. The fan section 36 includes a plurality of fan blades 36A that collectively define an outer radial fan diameter. The fan case 60 is disposed radially outboard of, extends axially along and may circumscribe the fan section 36 and its plurality of fan blades 36A. The fan case 60 may thereby house and may be configured as a containment structure for the fan section 36 and its plurality of fan blades 36A. The fan cowl 37, and more generally, the outer nacelle structure 24B is configured to provide an aerodynamic cover over the fan case 60. The compressor section 38 includes a low-pressure compressor (LPC 38A) and a high-pressure compressor (HPC 38B). The turbine section 42 includes a high-pressure turbine (HPT 42A) and a low-pressure turbine (LPT 42B). The engine sections are arranged sequentially along the centerline 30 within an engine housing; e.g., the LPC 38A, an intermediate case 44, the HPC 38B, the combustion section 40, the HPT 42A, the mid-turbine frame 46, the LPT 42B, and the turbine exhaust case (TEC 48), which collectively form the core of the engine 28. The LPC 38A is connected to and driven by the LPT 42B through a low-speed shaft 50. The HPC 38B is connected to and driven by the HPT 42A through a high-speed shaft 51.

In the gas turbine embodiment shown in FIG. 2, a fan drive gear system ("FDGS 56") is diagrammatically shown in communication with the low-speed shaft 50 and with the fan section 36. The FDGS 56 may be configured to accept a rotational drive input (e.g., from the low-speed shaft 50) at a given rotational speed ($RS_{INPUT}$) and torque ($T_{INPUT}$) and to produce an output rotational drive at a given rotational speed ($RS_{OUTPUT}$) and torque ($T_{OUTPUT}$) for the fan section 36. The present disclosure does not require an FDGS 56. In those engine 28 embodiments that include an FDGS 56, the present disclosure is not limited to any particular FDGS 56 configuration and does not require the FDGS 56 being driven by the low-speed shaft 50.

Air entering the gas turbine engine 28 through the airflow inlet 32 is bisected between a core gas path 52 and a fan bypass air path 54. A portion of the air entering the gas turbine engine 28 passes through the fan section 36 and enters the core gas path 52. The core gas path 52 extends through the core of the engine 28; i.e., through the LPC 38A, the intermediate case 44, the HPC 38B, the combustion section 40, the HPT 42A, the mid-turbine frame 46, the LPT 42B, and the TEC 48. Core gas exiting the LPT 42B exits the engine 28 via the exhaust 34. The remainder of the air entering the gas turbine engine 28 passes through the fan section 36 and enters the fan bypass air path 54 which is disposed radially outside of the core of the engine 28.

The gas turbine engine 28 configuration diagrammatically shown in FIG. 2 is an example provided to facilitate the description herein. The present disclosure may be implemented in a variety of different gas turbine engine 28 configurations and is not therefore limited to the gas turbine engine 28 configuration diagrammatically shown in FIG. 2.

The terms "forward" and "aft" are used herein to indicate the relative position of a component or surface. In a conventional axial engine 28 such as that shown in FIG. 2, the fan section 36 is forward of the compressor section 38 and the turbine section 42 is aft of the compressor section 38. The terms "inner radial" and "outer radial" refer to relative radial positions from the engine centerline 30. An inner radial component or path is disposed radially closer to the engine centerline 30 than an outer radial component or path.

As disclosed herein and shown in FIG. 1, the gas turbine engine 28 is housed within a nacelle 24, and both the gas turbine engine 28 and the nacelle 24 are structurally connected to an aircraft wing via the pylon 26.

Figure 3:
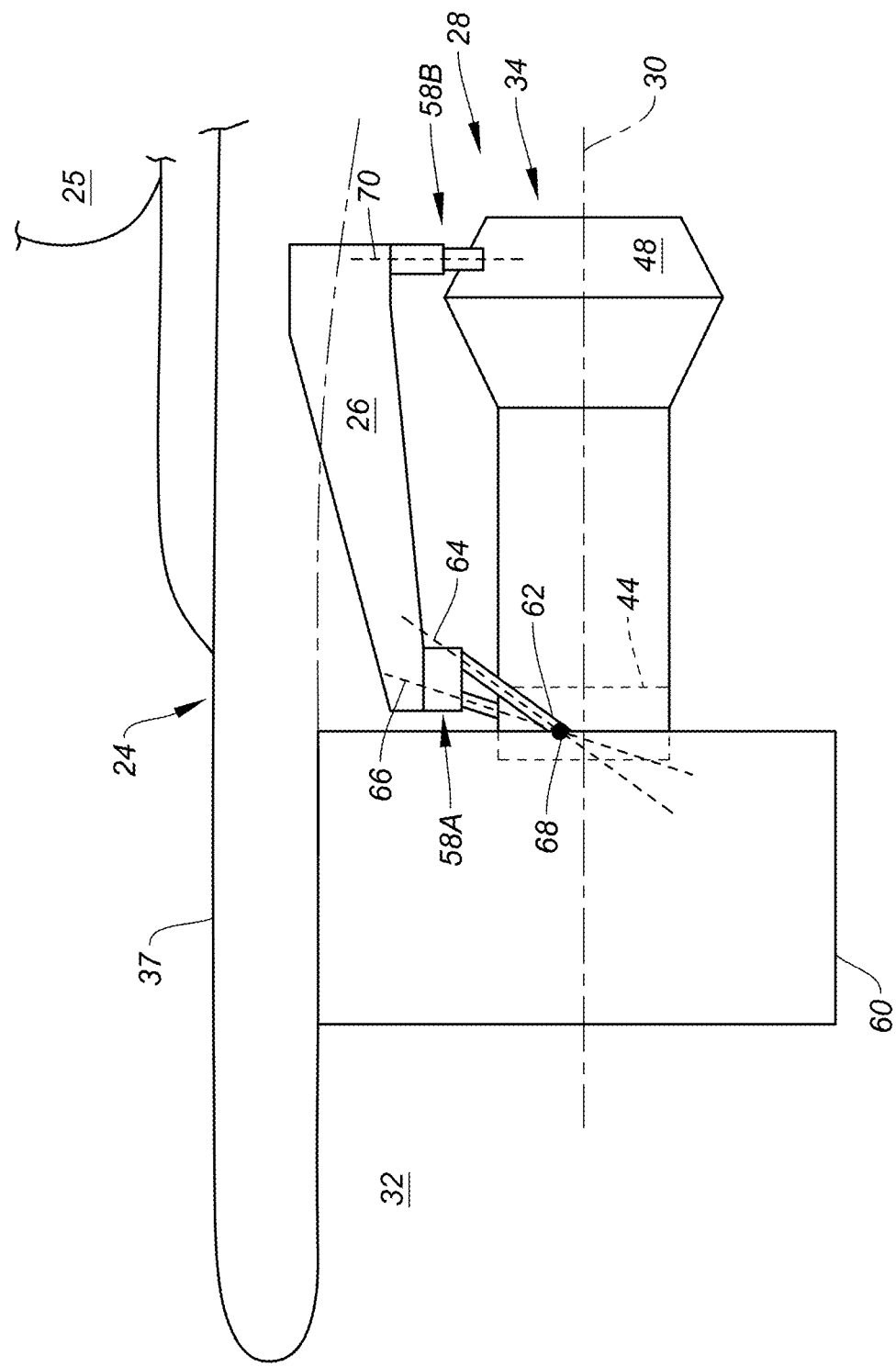
FIG. 3 is a diagrammatic view of a gas turbine engine mounted on an aircraft pylon, illustrating a thrust link vector intersection point disposed above the axial centerline of the gas turbine engine.

Referring to FIG. 3, the gas turbine engine 28 is structurally connected to a pylon 26 by a forward mount 58A and an aft mount 58B. The forward and aft mounts 58A, 58B typically extend between the engine 28 and the pylon 26. Each of the forward and aft mounts 58A, 58B may be configured (e.g., via a linkage not shown) to accommodate a vertical load (i.e., a gravitational load acting along a gravitational vector) and a lateral load. In some embodiments, the mounts 58A, 58B may also be configured to accommodate a torque loading. The term "accommodate" as used herein refers to the mount 58A, 58B being designed in anticipation of a particular loading and therefore possessing the mechanical strength to withstand the particular loading without mechanical deficit such as but not limited to failure. The present disclosure is not limited to using any particular forward or aft mount 58A, 58B configuration. The forward mount 58A may be located at the compressor section 38 of the engine 28; e.g., at the intermediate case 44 disposed between the LPC 38A and the HPC 38B. FIGS. 3-6 diagrammatically illustrate the intermediate case 44 by a dashed line box. To facilitate the description herein, the present disclosure will be described as having a forward mount 58A located at the intermediate case 44. The present disclosure is not, however, limited to a forward mount 58A located at the intermediate case 44. The aft mount 58B is located aft of the forward mount 56A, typically in or adjacent the turbine section 42. For example, in some embodiments the aft mount 58B may be located at the TEC 48. As another example, in some embodiments the aft mount 58B may be located at the mid-turbine frame 46. The present disclosure is not limited to the aft mount 58B being positioned at the TEC 48 or at the mid-turbine frame 46. Analysis to date, however, suggests that positioning the aft mount 58B at the TEC 48 is beneficial in many applications. To facilitate the description herein, the aft mount 58B will be described as being positioned at the TEC 48 but is not limited thereto.

In some embodiments, thrust links 62 may be included that extend between the forward mount 58A (e.g., an aft portion of the forward mount 58A) and the engine 28 at the intermediate case 44. Each thrust link 62 extends along its own axially extending thrust link centerline 64. Thrust forces translating through a thrust link 62 during operation of the engine 28 may be represented as a thrust link vector that extends along the thrust link centerline 64. As can be seen in FIG. 3, the thrust link vector intersects with a mount plane 66 (diagrammatically represented by line 66) of the forward mount 58A at an intersection point 68. The mount plane 66 represents the plane in which the weight of the engine 28 transfers to the forward mount 58A; e.g., the plane in which linkage of the forward mount 58A is connected with a lug (or other structure) that is connected to the engine 28 and the weight of the engine 28 transfers therethrough. In the embodiment diagrammatically shown in FIG. 3, the intersection point 68 is disposed above the engine centerline 30; i.e., the intersection point 68 is disposed on the same side of the engine centerline 30 as the forward mount 58A.

The engine core is subject to several different loading components. The engine core is subject to natural, static backbone bending (e.g., a gravitational load that acts on the engine core as a bending load) when the engine 28 is secured at the forward mount 58A and at the aft mount 58B. A fan section 36 center of gravity ("CG") located forward of the forward mount 58A creates a moment around the forward mount 58A thereby affecting the bending load acting on the engine core. During operation of the engine 28, fan thrust can be approximated as acting through the engine centerline 30. When the intersection point 68 between the thrust link vector and mount plane 66 of the forward mount 58A is disposed above the engine centerline 30, the engine core may be subject to additional bending loads due to the moment arm between the engine centerline 30 and the intersection point 68.

As will be detailed herein, aspects of the present disclosure provide a means for evaluating the significance of the intersection point 68 location relative to the engine centerline 30, and a means for mitigating the engine core bending load.

Figure 4:
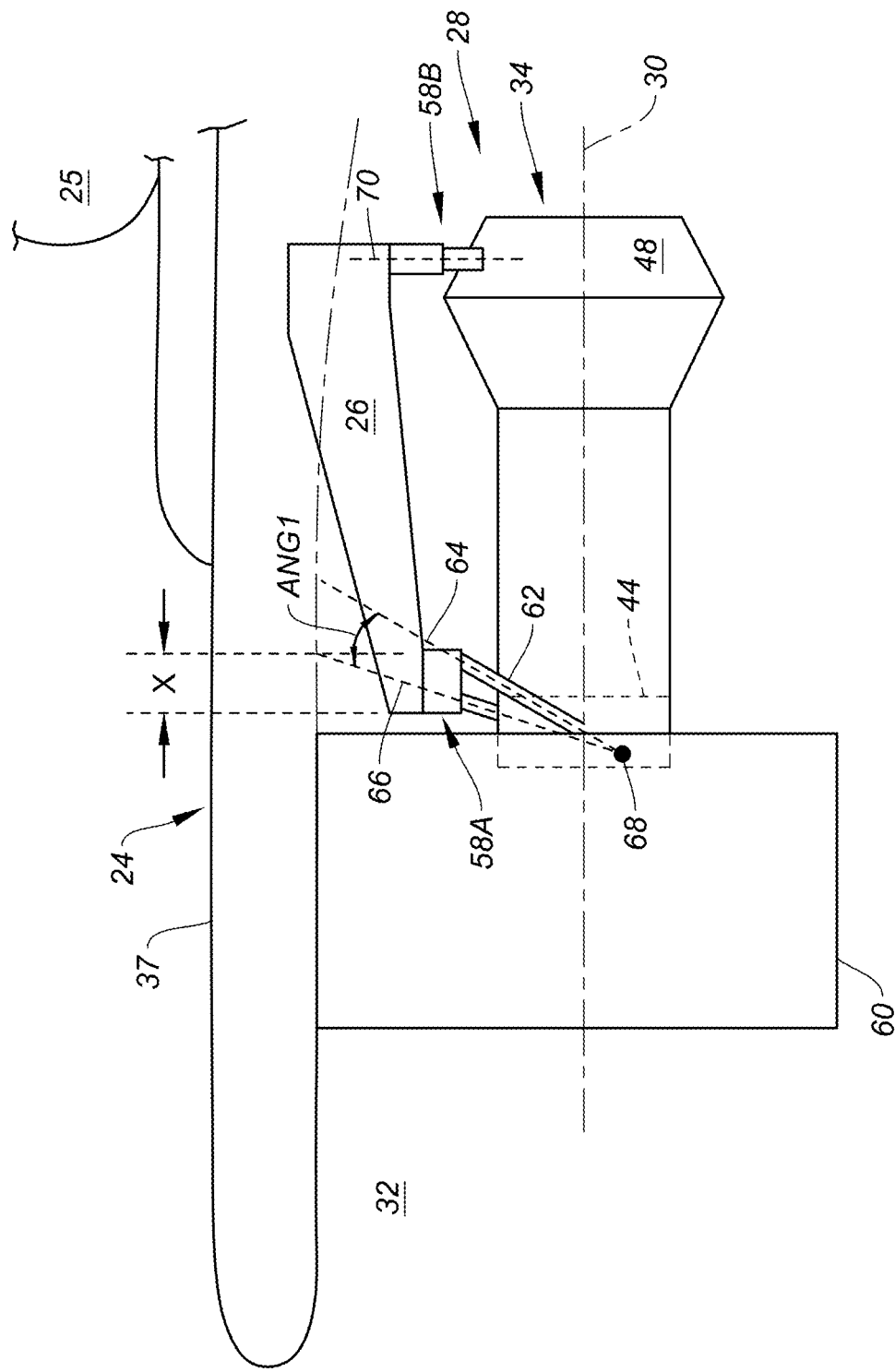
FIG. 4 is a diagrammatic view of a gas turbine engine mounted on an aircraft pylon, illustrating a thrust link vector intersection point disposed below the axial centerline of the gas turbine engine.

Referring to FIG. 4, a gas turbine engine 28 is diagrammatically illustrated that is connected to the pylon 26 by a forward mount 58A disposed at the intermediate case 44 and an aft mount 58B disposed at the TEC 48. In this embodiment, thrust links 62 are included that extend along thrust link centerline 64 between the forward mount 58A (e.g., an aft portion of the forward mount 58A) and the intermediate case 44. The aft mount 58B may be described as having an aft mount plane 70 (represented by line 70) extending vertically through the aft mount 58B. The aft mount plane reflects the connection between the engine 28 and the pylon 26 within the aft mount 58B and the load path (e.g., gravitational load) therethrough. Thrust forces translating through the thrust links 62 during operation of the engine 28 may be represented as thrust link vectors. In this embodiment, the thrust links 62 are oriented so that the thrust link vectors intersect with the mount plane 66 of the forward mount 58A. The intersection point 68 is located below the engine centerline 30. The phrase "below the engine centerline 30" is used herein to refer to the side of the engine centerline 30 opposite the side of the centerline 30 where the forward and aft mounts 58A, 58B are engaged with the engine 28. The position of the intersection point 68 (below the engine centerline 30) creates a moment arm between the engine centerline 30 and the intersection point 68 that counteracts the gravitational bending load on the engine core. The degree to which the moment counteracts the gravitational bending load may be varied by moving the position of the intersection point 68.

In this embodiment, thrust produced by the fan section 36 during operation of the engine 28 acts through the engine centerline 30 and will counter the gravitational/bending load acting on the engine core. The present disclosure does not require any particular configuration for the forward mount 58A or the aft mount 58B; e.g., torque may be reacted by the forward mount 58A or the aft mount 58B.

Figure 5:
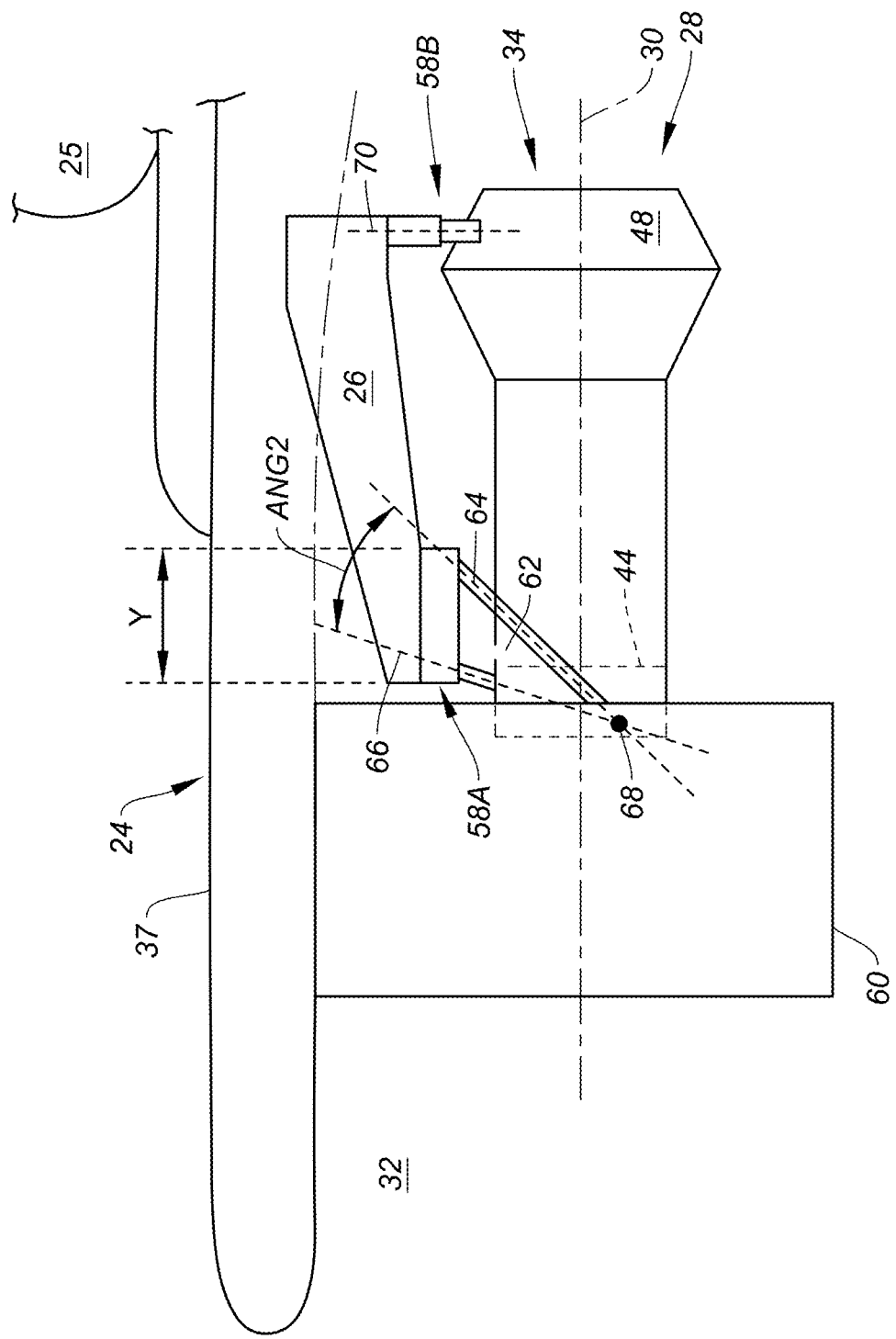
FIG. 5 is a diagrammatic view of a gas turbine engine mounted on an aircraft pylon, illustrating a thrust link vector intersection point disposed below the axial centerline of the gas turbine engine with an axially extended forward mount.

In some embodiments, the axial length of the forward mount 58A may be increased to modify the angle of the thrust link 62. A forward mount 58A having an axial length of "X" is diagrammatically shown in FIG. 4. The forward mount 58A diagrammatically shown in FIG. 5 has an axial length of "Y" where "Y" is greater than "X". The difference in forward mount 58A axial length (Y>X) may be used to change the angle of the thrust link 62 and therefore the orientation of the thrust link vector. FIG. 4 diagrammatically illustrates the included angle "ANG1" between the mount plane 66 of the forward mount 58A and the thrust link centerline 64, and FIG. 5 diagrammatically illustrates the included angle "ANG2" between the mount plane 66 of the forward mount 58A and the thrust link centerline 64, where ANG2>ANG1.

Figure 6:
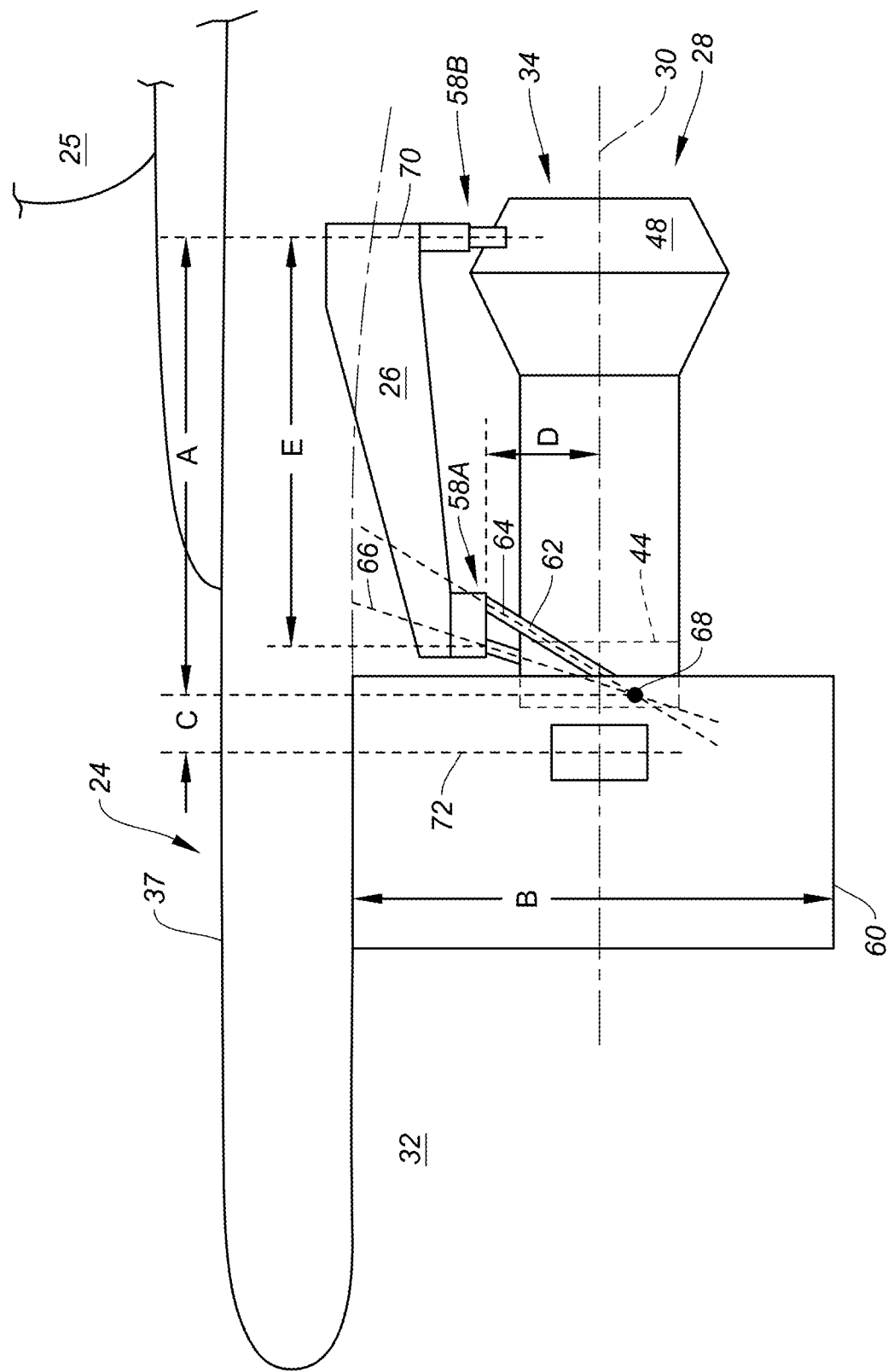
FIG. 6 is a diagrammatic view of a geared turbofan gas turbine engine mounted on an aircraft pylon, illustrating a thrust link vector intersection point disposed below the axial centerline of the gas turbine engine.

Referring to FIG. 6, a gas turbine engine 28 is diagrammatically illustrated that is connected to the pylon 26 by a forward mount 58A disposed at the intermediate case 44 and an aft mount 58B disposed at the TEC 48. This embodiment is configured like the embodiment shown in FIG. 5 (e.g., with the intersection point 68 below the engine centerline 30) except that the gas turbine engine 28 is configured as a geared turbofan and includes an FDGS 56. The weight and position of the FDGS 56 can significantly affect the center of gravity ("CG") of the fan section 36 (e.g., move the fan section CG forward) and consequently affect the bending load acting on the engine core.

As stated above, the present disclosure stems from the discovery that a bending load acting on an engine core can be mitigated by particular mounting considerations of the engine 28 vis-à-vis the pylon 26. For example, the bending load acting on the engine core may be mitigated by a mounting system in which the intersection point 68 (between the thrust link vectors and the mount plane 66 of the forward mount 58A) approaches or is at the engine centerline 30. Current analysis indicates that an intersection point 68 (between the thrust link vectors and the mount plane 66 of the forward mount 58A) that is disposed below the engine centerline 30 may provide more substantial bending load benefits. An intersection point 68 disposed below the engine centerline 30 is understood to be particularly beneficial for geared turbofan engines that utilize an FDGS 56 disposed axially forward of the forward mount 58A.

The following example illustrates a present disclosure engine mounting configuration that is understood to provide the aforesaid benefits. Referring to FIG. 6, the intersection point 68 is aligned with the mount plane 66 of the forward mount 58A. The center of gravity (represented by line 72) of the FDGS 56 is disposed forward of the intersection point 68.

An intersection point 68 utilized in this engine mounting configuration may be evaluated in terms of a parameter "P" that takes into consideration relevant physical dimensions of the engine 28. The following algorithmic expression is an example of how the parameter may be determined:

$$P=(B/E)*(-C/D)$$

The reference letter "P" refers to the parameter value. Referring to FIG. 6, the reference letter "A" refers to the axial distance between the mount plane 70 of the aft mount 58B and the intersection point 68. The reference letter "B" refers to the outer radial diameter of the fan section 36. The reference letter "C" refers to the axial distance between the intersection point 68 and the vertical line 72 extending through the CG of the FDGS 56. This distance may also be referred to as the "FDGS axial distance" and is assigned a negative sign convention. The reference letter "D" refers to the vertical distance between the engine centerline 30 and the point where the thrust link 62 connects with the forward mount 58A. The reference letter "E" refers to the axial distance between the mount plane 70 of the aft mount 58B and the mount plane 66 at the connection between the engine 28 and the pylon 26 within the forward mount 58A.

Analysis indicates that intersection points 68 disposed below the engine centerline 30 that provide desirable loading benefits may have a parameter value "P" that is less than zero. The analysis also indicates that parameter "P" values that are in the range of about negative two and three tenths to about negative forty six one-hundredths (i.e., P in the range of about −2.3 to about −0.46) provide more appreciable loading benefits, and that intersection points 68 disposed below the engine centerline 30 provide desirable loading benefits for turbofan engines having an outer radial fan diameter of about one hundred and ten inches (110") or less.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. An aircraft system, comprising:
   a pylon;
   a gas turbine engine comprising a compressor section, a fan section, and a turbine exhaust case (TEC), wherein the gas turbine engine has an axially extending engine centerline;
   a forward mount connected to the compressor section and to the pylon along a mount plane;
   an aft mount connected to the TEC and to the pylon; and
   a thrust link that extends along a thrust link centerline between the forward mount and the compressor section;
   wherein the thrust link is oriented such that a thrust link vector coincident with the thrust link centerline intersects with the mount plane at an intersection point that is located below the engine centerline.

2. The aircraft system of claim 1, wherein the compressor section includes an intermediate case, and the forward mount is connected to the intermediate case.

3. The aircraft system of claim 2, wherein the compressor section includes a low pressure compressor section and a high pressure compressor section, and the intermediate case is disposed axially between the low pressure compressor section and the high pressure compressor section.

4. The aircraft system of claim 1, wherein the thrust link is engaged with the forward mount at an aft end of the forward mount; and
wherein an acute angle is disposed between a line disposed within the mount plane and the thrust link centerline.

5. The aircraft system of claim 1, wherein the gas turbine engine is a geared turbofan engine that includes a fan drive gear system that has a center of gravity.

6. The aircraft system of claim 5, wherein the center of gravity of the fan drive gear system is located forward of the intersection point.

7. The aircraft system of claim 1, wherein the fan section has an outer radial fan diameter of about one hundred and ten inches or less.

8. The aircraft system of claim 1, wherein the forward mount is configured to accommodate a gravitational load, a lateral load, and a torque load.

9. The aircraft system of claim 1, wherein the aft mount is configured to accommodate a gravitational load, a lateral load, and a torque load.

10. An aircraft system, comprising:
a pylon;
a gas turbine engine comprising an axially extending engine centerline, a fan section, a compressor section, a turbine exhaust case (TEC), and a fan drive gear system (FDGS), wherein the fan section has a fan outer radial diameter value;
a forward mount connecting the compressor section to the pylon at a connection point, wherein a mount plane extends through the connection point;
an aft mount (AM) connected to the TEC and to the pylon, wherein the aft mount is separated from the forward mount by a mount separation distance value;
a thrust link that extends along a thrust link centerline between the forward mount and the compressor section, wherein the thrust link is oriented such that a thrust link vector coincident with the thrust link centerline intersects with the mount plane at an intersection point;
wherein the FDGS includes a center of gravity (CG) and the FDGS CG is separated from the intersection point by an FDGS axial distance value;
wherein the system is configured such that when a parameter value "P" is determined using the mount separation distance value, the fan outer radial diameter value, the FDGS axial distance value, and the AM radial distance value, and an expression:

$P=(B/E)*(-C/D)$ wherein within the expression, "B" represents the fan outer radial diameter value, "E" represents the mount separation distance value, "C" represents the FDGS axial distance value, and "D" represents the vertical distance between the engine centerline and the connection point, and the determined value for "P" is less than zero.

11. The aircraft system of claim 10, wherein the intersection point is located below the engine centerline.

12. The aircraft system of claim 11, wherein the intersection point is located aft of the FDGS CG.

13. The aircraft system of claim 10, wherein the determined value for "P" has a value that is in the range of −2.3 to −0.46.

14. The aircraft system of claim 10, wherein the fan section has an outer radial fan diameter of about one hundred and ten inches or less.

15. The aircraft system of claim 10, wherein the compressor section includes an intermediate case, and the forward mount is connected to the intermediate case.

16. The aircraft system of claim 15, wherein the compressor section includes a low pressure compressor section and a high pressure compressor section, and the intermediate case is disposed axially between the low pressure compressor section and the high pressure compressor section.

17. The aircraft system of claim 16, wherein the thrust link is engaged with the forward mount at an aft end of the forward mount; and
wherein an acute angle is disposed between a line disposed within the mount plane and the thrust link centerline.

18. The aircraft system of claim 10, wherein the forward mount is configured to accommodate a gravitational load, a lateral load, and a torque load.

19. The aircraft system of claim 18, wherein the aft mount is configured to accommodate a second gravitational load and a second lateral load.

20. The aircraft system of claim 10, wherein the aft mount is configured to accommodate a gravitational load, a lateral load, and a torque load.

* * * * *